G. DEMAILLY.
Systems of Purifying Water Chemically and Mechanically.
No. 143,676.      Patented Oct. 14, 1873.
FIG. 1.      FIG. 3.
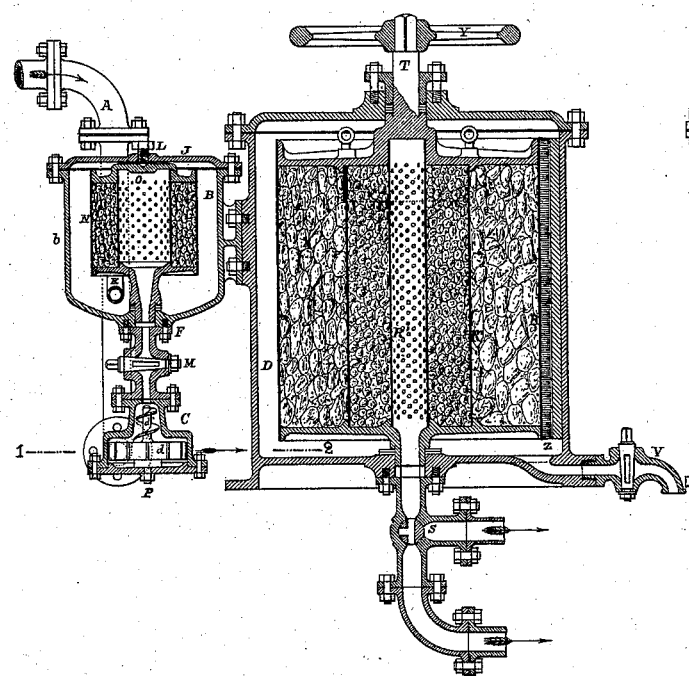
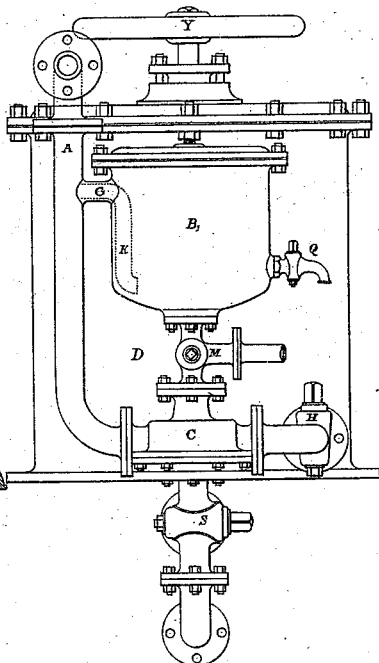
FIG. 2.
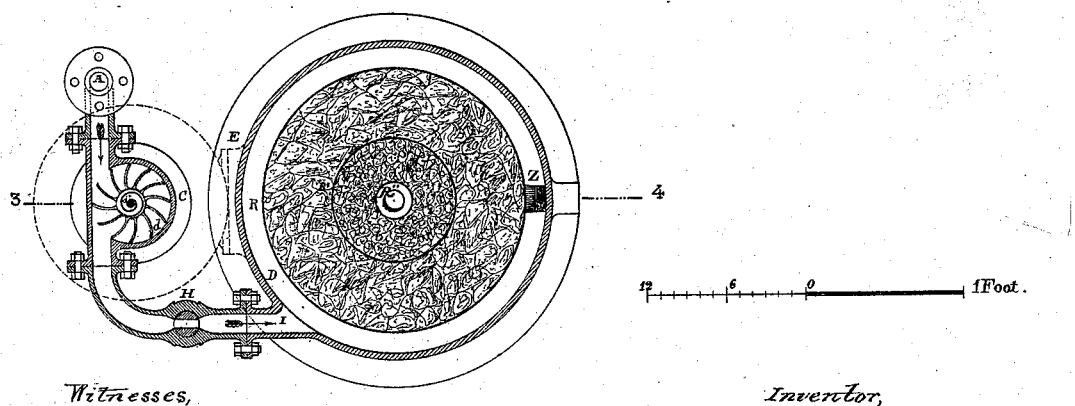
Witnesses,
Inventor,
Gustave Demailly

UNITED STATES PATENT OFFICE.

GUSTAVE DEMAILLY, OF BRUSSELS, BELGIUM.

IMPROVEMENT IN SYSTEMS OF PURIFYING WATER CHEMICALLY AND MECHANICALLY.

Specification forming part of Letters Patent No. 143,676, dated October 14, 1873; application filed March 22, 1873.

*To all whom it may concern:*

Be it known that I, GUSTAVE DEMAILLY, of Brussels, Kingdom of Belgium, have invented certain Improvements in Systems of Purifying Water Chemically and Mechanically, of which the following is a specification:

The object of the apparatus is to purify water before using it for industrial purposes or domestic use.

I shall first mention water used for feeding steam-generators, then of water used in the several industries that employ it otherwise than as a motive power, and, lastly, of water used for domestic purposes.

The great quantity of water which successively circulates in a generator to be there converted into steam leaves, by the effect of evaporation, calcareous and other deposits, which adhere to the inner sides of the generator, or accumulate in heaps, producing in both cases serious hinderance to the working of the apparatus, and is the cause of almost all the accidents by explosion. The efforts made to overcome these defects have all proved ineffectual, if not dangerous. I have endeavored to solve the problem in treating the water to be supplied before its introduction into the generator by purifying it by a chemical process combined with mechanical aid.

My system, while suppressing the causes of accident, effects a great saving of fuel, time, and money, and it can readily be applied to every description of generator, no matter of what form or combination, fixed or movable, whether applied to tubular or other boilers, for railways, or for navigation.

If non-purified water has such serious drawbacks when used for feeding steam-generators, the same may be said of its use in the various industries where it is employed otherwise than as a motor. If, for instance, in using it for bleaching or scouring thread and tissue-paper-pulp, or other matter, the water, containing calcareous salts and other substances in solution, requires the use of a greater quantity of chlorine and other chemicals, it is a hinderance to complete or perfect bleaching. If, on the other hand, the water is used in dyeing, the non-purified water is the cause of accidents and the want of success in light and delicate shades, a waste of soap, soda, tartar, and so on, which are in vain employed in excess. The use of this water makes dyeing much more difficult by upsetting all practical experience, by rendering illusive all the calculations and quantities given by the wisest chemists and most able practitioners.

Non-purified waters contain certain salts in solution, and when employed in the various domestic uses, such as drink, cooking, washing, and so on, have long since been condemned by medical science as destructive to health.

I also reserve to myself the use of my apparatus in combating this complex question, which it completely solves. Since it is easy to purify water charged with the greatest quantity of foreign salts, my purifier may be applied in all cases of distribution or supply of water, whether acting independently as a reservoir, fountain, ordinary filter under the influence of the suction or forcing pump of any kind, as well as by a simple branching on the conduit distributing water to a town.

The following are the chemical considerations which led me to the adoption of my purifying apparatus: Soft waters contain in solution different salts, in greater or less proportions, but mainly in the condition of bicarbonates of lime or magnesia, alkaline chlorides, sulphates, oxide of calcium or magnesia, chlorides of the same substances, and also, but in smaller proportions, ammonia, nitrate of potash, oxide of iron, some of which contain sulphate and protoxide of iron, others carbonate of protoxide of iron, maintained in solution by an excess of carbonic acid.

These different salts are in solution in the following waters in very different proportions, the composition of the waters varying with their source on account of the inner layers of earth which they traverse, or on which they circulate on the surface above. Calcareous waters contain lime combined with carbonic acid, and form bicarbonates of lime. Selenious waters contain lime combined with sulphuric acid, forming sulphate of lime. Chemical analysis and experience show which of these two salts predominates.

Water frequently contains in solution bicarbonate of lime in large quantities. This mixture is the most formidable in industry, and which must be combated.

Although my apparatus is applicable to purifying water containing a salt of some kind, it is equally applicable to the purification of calcareous water. Having found that the mechanical treatment it is necessary to submit these waters to presents more difficulty than other water holding in solution other salts, I shall merely mention the treatment of the other principal cases.

In adding to the calcareous water—that is to say, charged with bicarbonate of lime—a small proportionate quantity of solution of caustic lime, it is immediately troubled in presenting a precipitate, formed by the action of the carbonic acid, by immediately depositing carbonate of lime. Instead, therefore, of matters in solution, it only rests to treat matters in suspension. But in thus treating masses of water more or less considerable it is necessary, first, to obtain lime-water—that is to say, clear water containing lime in solution—in sufficient quantity and rapidity; second, to be able to make the mixture in sufficiently correct proportions of lime-water with the mass of water to be purified; and, third, to effect a quick clarification of the mixture.

In the solution of this question I have combined in one single apparatus, without delay or intermediaries, the chemical and mechanical means. I have therefore a clarifying apparatus of great power and of novel construction, combined with an apparatus destined to the manufacture of clear lime-water in a continuous manner and in proportionate distribution. The latter apparatus is also destined to perfectly mix the lime-water with the mass of water to be purified as fast as it is used, forming the chemical operation which troubles the water, and which, by the absorption of the carbonic acid, transforms the bicarbonate of lime in solution into carbonate of lime in suspension. The water thus treated and prepared—that is to say, no longer containing anything but matters in suspension—is admitted into the filter, which retains them, allowing only pure water to be delivered.

The apparatus may be applied to all other cases of purification. It suffices to replace the solution of lime-water which acts on the water charged with bicarbonate of lime by the chemical agent judged the most efficacious for acting on the salts in solution.

The selenious waters may be treated by my apparatus by mixing with them, by the same means, a solution of carbonate of soda. A precipitate is then formed of carbonate of lime, as well as by the use of nitrate of ammonia, oxalate of ammonia, and chlorate of barium.

The annexed drawing represents my purifying apparatus.

Figure 1 is a vertical section by the line 3 4 of Fig. 2. Fig. 2 is a sectional plan following the line 1 2 of Fig. 1, and Fig. 3 is a side elevation.

A is the pipe receiving the non-purified water. B is the recipient and manufacturer of the lime-water. C is the mixing and distributing apparatus. D is the filter. The filter D supports the recipient B, which is fixed at E by four bolts. This recipient is united to the mixer C at F; and the supply-pipe A is connected by a tube, G, to the recipient B, and directly with its base to one of the orifices of the mixer C, the other orifice being united, by the tap H, to the tube I of admission to the filter. The apparatus works under a pressure of some meters. It may also work by the aspiration of the feed-pump. The purified water flows into a reservoir of any description, or it may be directly conveyed by force into the generator. The recipient producing the lime-water, B, consists of a vertical cylindrical case of cast-iron, $b$, with a lid, J, at the top. The water, which is in this recipient at the same pressure as in the pipe A, is directed toward the bottom of this recipient by the inner pipe K. In the case $b$ is another vertical cylindrical body, formed of two cast-iron plates and two cylinders of sheet-iron, forming an annular cylindrical capacity, N, furnished with filtering substances and a pipe, $o$. This cylindrical filtering body forms part with the base of the recipient B. It is locked top and bottom by the adjusting-screw L. At the base is fixed a three-way tap, M. One of the openings communicates with the recipient, the other in the same axis puts the mixer and recipient in communication, and the third branches on the water-supply of the generator. This latter may in many cases be dispensed with. A discharge-tap, Q, is fixed to the case $b$. (See Fig. 3.) In the recipient B I place a certain quantity of lime, which dissolves in proportion to the water contained, and according to the water's continuous arrival. The lime-water thus formed flows by pressure through the filtering-cylinder, and arrives in the central pipe perfectly clear, and ready for distribution or mixing by the tap M, and in the necessary proportion. This rapid and continuous operation does not require the use of large cisterns or reservoirs for producing lime-water, and does away with hand labor. The mixer C consists of a bent-winged wheel, $d$, terminating at the top by a screw, $d'$. The wheel $d$ turns on an inverted pivot on the vertical fixed axis P. It is lodged in a cylindrical chamber perpendicular with the axis of the recipient B, and tangent to the common axis of the supply-pipe A of the tap H, and of the tube of admission into the filter D. Supposing the tap H is open, the water arriving by the pipe A to enter the chamber D will meet in its passage the paddles of the wheel $d$, which wheel, under the action of the current, is animated by a rotary motion of a speed in accordance with the flow. The conical screw $d'$, forming part of the wheel $d$, lodges in a capacity of the same form, and produces by its movement of rotation an effect of aspiration from top to bottom, the pressure being the same for the mass of water arriving by the pipe A and that contained in the recipient B. Nevertheless, without the action of the current arriving by A, it might happen that the lime-water would remain stationary, and in a manner suspended between two equal pressures. The aspiration of the screw, however, breaks the equilibrium, and allows the lime-water to flow in sufficient quantity, regulated according to the opening of the tap M, and that the mixture of lime-water with the mass of water to be purified takes place in a regular and continuous manner, and as perfectly as possible, and during the working of the machine only. At this juncture the water admitted in the filter D will only contain organic matters and carbonates of lime in suspension. These matters will then be retained by the filter D, a description of which here follows.

This filter consists of a vertical and cylindrical case in sheet or cast iron, and furnished with a lid. In this case is placed another cylindrical body, which is the filter proper. This cylindrical body is formed of two sheets of cast-iron, one at the top and the other below, and united by three concentric cylinders in sheet-iron, and perforated and very thin, R R' R''. These cylinders form annular capacities furnished with filtering matter. The water arriving in the filter by the tap H spreads itself in the open space between the envelope and the filtering-cylinder; then, by pressure, traverses the latter, and makes its exit by the tap S, (see Fig. 1,) perfectly clear, and freed from all matter in suspension that it contained. The exit-pipe S communicates at one side either with a reservoir or with a feed-pump, and by the third tube, serving to cleanse it, with a water-supply in the generator. An emptying-tap, V, is arranged at the base of the filter in order to allow the matters retained to flow out when cleansing. The feed-pump, drawing on the filter, returns the purified water to the generator.

The operation, therefore, is of the simplest nature, since with a single apparatus, and almost instantaneously, the results following are obtained — that is to say, the manufacture of a sufficient quantity of filtered lime-water, proportionately and perfectly mixed with the mass of water to be purified, and, finally, the clarification of this mixture.

There still remains an important question to decide, that of insuring the constant and perfect working of the apparatus by cleansing it, and the removal of the residue retained in the filter. Such residue would in a short time impede the passage of the water and diminish production.

My filtering apparatus is combined in such a manner that the cleansing is effected without the necessity of taking the apparatus to pieces or loss of time, and as often as required, according to the quantity of water employed.

The oftener the cleansing is done the easier it becomes, as there is a smaller amount of residue to be operated upon. One cleansing at the end of a day's work is sufficient. When the steam-engine is stopped, the tap H, admitting water into the filter, is closed, as well as the tap S, communicating with the feed-pump, which allows of free communication with the central pipe of the filter and water-draft of the generator.

Opening the emptying-tap V, it will at once be seen what has taken place. The pressure of the generator sends the hot water already purified into the central pipe of the filter. This water traverses inversely the beds or layers of filtering matter, and draws along with it the foreign organic matters arrested during filtration. These matters, moreover, not having penetrated very deeply, flow with the water through the emptying-tap. Besides, the whole cylindrical filtering-body placed vertically in the case is movable on the pivot at the base, and communicates with the exterior of the shaft T, placed at the top and furnished with a fly-wheel. (See Fig. 1.) By aid of this fly-wheel, the heater imparts to the cylindrical filtering-body a circular movement, the effect of which is to pass several times the external surface of the cylinder under the friction of a brush, Z, Fig. 2, fixed vertically at the inner side of the case, which suffices to dislodge the residue which might be adhering thereto. (See also Fig. 1.) In a few minutes the cleansing is completed, the draft on the generator and the emptying-tap is closed, and the apparatus is again ready for work.

The cleansing of the recipient B is effected each time that the requisite quantity of lime is placed in the case, the operation being as in the case of the filter D. The results effected by my purifier are thus perfectly insured by its operation and ready mode of cleansing; consequently all the important advantages heretofore described, and which are of the greatest importance to industry, are thus embraced in a small compass.

The filter of the recipient of the lime-water contains, as filtering matter, felt or wool rendered imputrescible by means of tannate, ferric, or permanganate of soda.

The two annular capacities of the filter D are furnished, the first with felt or wool rendered imputrescible; the second with sponge cut up and refined. These layers, suitably pressed, are not overtaxed, and will last a long time without renewing. If, however, it is necessary to remove them once or twice a year, it can be accomplished in an hour.

I have taken the case of an apparatus working under the influence of the feed-pump of the steam-engine, as it is one of the most general cases; but the apparatus gives the same results under other circumstances. Under the pressure of some meters—that is to say, if the water arrives from a conduit or reservoir placed at five or six meters only higher—the purified water flows into a reservoir or conduit of any kind, to be distributed, according to desire, partly for feeding the generators and partly for any other industrial purpose.

If the feeding should be effected by an injector, the latter can be attached to the purifier in the place and position of the feed-pump.

In case the water is to be stored in a reservoir, to be distributed thence as supplies to machinery—on lines of railway, for instance—my purifier is employed with the same advantages. These reservoirs, established on the line, at certain stations, a few meters above the tenders, are usually fed by steam or some horse power, which draws the water from a well, from a stream, from a river, or from a pond, to convey it thence to the reservoir on the line.

My purifier can be fixed either to the suction-conduit near the water-draft or on the conduit of supply, in no matter what position. In this case the pressure of the purified water is utilized by cleansing the filter. In this case I advise more especially the use of a purifier composed of twin filters of the same length and the same recipient for the manufacture of the lime-water, and fed by a supply-pipe common to both. These two filters have a common or universal tap of admission of three ways, which allows of the cleansing of either of the filters by the purified water arriving from the other. The two filters are put in communication by a straight pipe, which unites them by the third tube of their exit-tap of three ways. This combination admits of the arrest of the admission of water in one or other of the filters, of opening the discharge-tap, of stopping the communication of exit with the recipient, and allowing this communication with the exit of the other filter and the central pipe by which the purified water enters in the filter to be cleaned, traverses the filtering-beds in an inverse manner, and draws along with it the refuse or residue deposited inside these beds or layers, and escapes as well as the water by the emptying-tap.

I have selected and illustrated in the drawings the form best adapted to suit the generality of cases for industrial purposes; but I reserve to myself the right of modifying the form and agencies, as the case may require.

I claim—

The combination of the pipe A, lime-water producer B, wheel $d\ d'$, and filter D, substantially as and for the purpose set forth.

GUSTAVE DEMAILLY.

Witnesses:
TH. DILLIER,
E. VAN DORIEN.